United States Patent [19]
Wallace et al.

[11] Patent Number: 5,908,045
[45] Date of Patent: Jun. 1, 1999

[54] GROUND MOISTURE SENSOR WITH A LATERAL PLANE ANTENNA

[76] Inventors: Blair Arthur Wallace, 18484 Preston Rd. #102, Dallas, Tex. 75252; Richard Garth Webster, 605 S. Howeth, Gainesville, Tex. 76240

[21] Appl. No.: 08/794,469

[22] Filed: Feb. 4, 1997

[51] Int. Cl.⁶ ............................................. F16K 17/36
[52] U.S. Cl. ......................................................... 137/78.3
[58] Field of Search ........................... 137/624.12, 78.3, 137/1, 2; 239/64, 70

[56] References Cited

U.S. PATENT DOCUMENTS

| | | | |
|---|---|---|---|
| 2,611,643 | 9/1952 | Higgins . | |
| 2,768,028 | 10/1956 | Robinson | 137/78.3 |
| 3,991,375 | 11/1976 | Riggs et al. | 239/64 |
| 4,137,931 | 2/1979 | Hasenbeck | 137/78.3 |
| 4,216,789 | 8/1980 | Hasenbeck | 239/63 |
| 4,333,490 | 6/1982 | Enter, Sr. | 137/78.3 |
| 4,548,225 | 10/1985 | Busalacchi | 239/64 |
| 4,684,920 | 8/1987 | Reiter | 239/70 |
| 4,718,446 | 1/1988 | Simpson | 137/624.11 |
| 4,785,843 | 11/1988 | Nicholson | 239/64 |
| 4,838,296 | 6/1989 | Brooks | 137/624.11 |
| 4,934,400 | 6/1990 | Cuming | 137/624.12 |
| 4,993,640 | 2/1991 | Baugh | 137/78.3 |
| 5,060,859 | 10/1991 | Bancroft | 239/69 |

*Primary Examiner*—A. Michael Chambers
*Attorney, Agent, or Firm*—Mark W. Handley; Gregory M. Howison

[57] ABSTRACT

An irrigation system is disclosed for determining that the moisture content of various zones of the soil are irrigated to consistent levels. A moisture sensor has lateral spaced apart antennas which extend within a horizontal plane. The moisture sensor is disposed in the soil within one of the various regions. An irrigation piping branch includes a control valve which controls the flow of water through the irrigation branch. When the control valve is open, an irrigation fluid will pass through the valve and the irrigation branch for distribution to an irrigation region of the soil. Once the moisture within the soil of the irrigation region reaches a preselected level within the horizontal plane proximate to the moisture sensor, the valve will automatically be closed, stopping the flow of the irrigation fluid from the irrigation branch to the irrigation region of the soil. The irrigation system includes an irrigation branch and a moisture sensor may be located proximate to a building foundation for maintaining consistent levels of moisture within the soil beneath the foundation. The irrigation system further includes a piping branch which extends into an irrigation zone having multiple regions. A master valve controls the flow of irrigation fluid into the piping branch, and secondary valves are disposed within separate sections of the piping branch for controlling the flow of irrigation fluids to corresponding ones of the multiple regions. Moisture sensors are disposed in various ones of the multiple regions for separately controlling corresponding ones of the secondary valves.

19 Claims, 8 Drawing Sheets

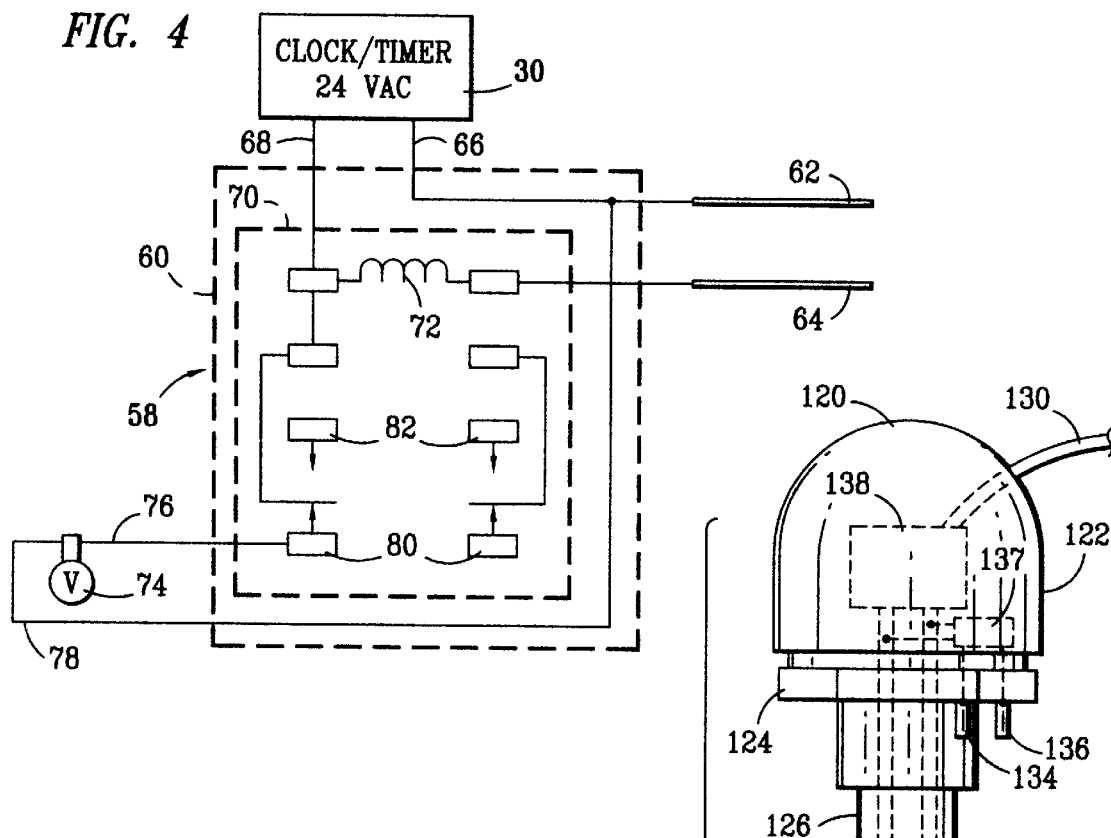
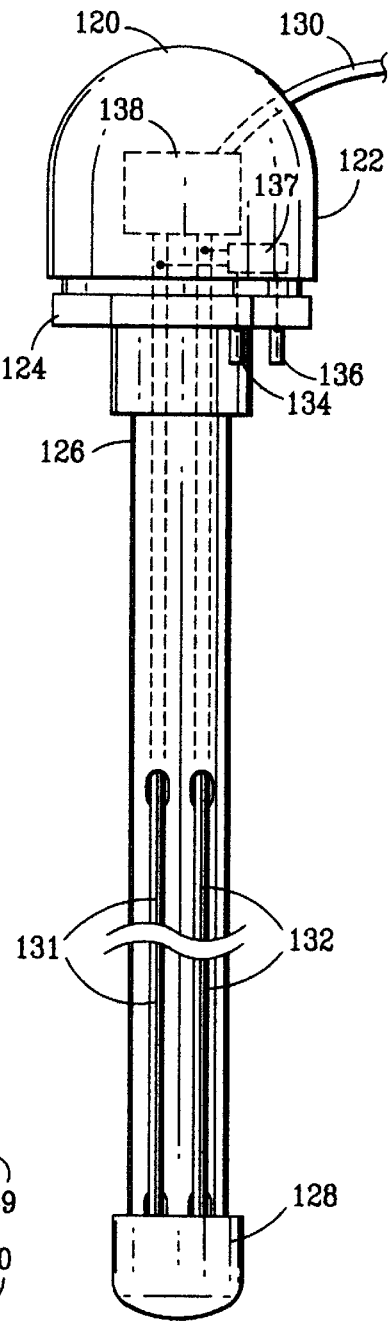
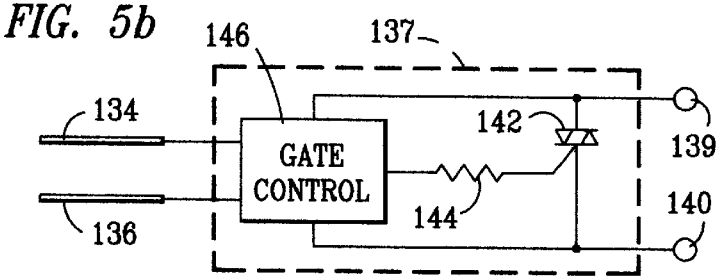

GROUND MOISTURE SENSOR WITH A LATERAL PLANE ANTENNA

TECHNICAL FIELD OF THE INVENTION

This present invention relates in general to an apparatus for irrigation and, more particularly, to an apparatus for assuring uniformity in moisture levels of soils in various zones of an irrigation system.

BACKGROUND OF THE INVENTION

Irrigation is needed in many arid areas for supplying water to architectural vegetation. Greenery is often planted around homes, commercial buildings and apartment developments to provide an attractive outdoor appearance for them. In order to minimize the manual labor of such irrigation and to avoid loss of plants when irrigation is forgotten, clocks are often used to control electrically actuated valves which supply water to the irrigation system. Such clocks have been developed to a point where one or more days of the week can be selected for sprinkling. Furthermore, the time of day and duration of sprinkling can also be selected. Such clocks sometimes have a plurality of terminals which can be connected to different water control valves for the control thereof Such terminals are often referred to as stations. The clock usually sequentially energizes the stations, and the clock can be adjusted so that each station has its own individual adjustment of on time. In this way, irrigation of a number of different areas, each served by a station and a sprinkler valve, can be employed to deliver water to these areas in accordance with the program determined by the clock and independent of ground moisture. It would be desirable to conserve water by limiting the delivery of irrigation water when the ground moisture is adequate.

Irrigation systems are well-known for applying water to turf areas for maintaining the turf or vegetation growing there. Such systems include sprinklers distributed over the area, valves for controlling the flow of pressurized water to the sprinklers from underground water supply pipes, and an irrigation controller for operating the valves in accordance with a desired irrigation cycle stored in the controller. The controller often includes solid state logic means which allows the user to input and store practically any desired irrigation cycle.

Many known irrigation controllers operate automatically as time elapses to turn the sprinkler valves on and off at designated intervals without taking actual environmental conditions, i.e. actual soil moisture, into account. However, this is wasteful and unduly expensive as it uses water which may not be needed. In some cases, the irrigation controller includes a rain switch to stop an irrigation cycle when it is raining. While useful, this is not an exact measure of soil moisture and can potentially stop an irrigation cycle that may be needed despite the rain.

Interest has grown recently in soil moisture sensing technology in which the soil moisture level is measured directly and is used to control the irrigation process. Various types of soil moisture sensors have been proposed, including some which interface directly with an irrigation controller or valve to apply a control function. Such sensors usually provide a soil moisture reading when an input voltage is applied to them.

Many shrubs and trees have extensive root systems which reach deep into the soil profile, typically one to two feet. Most turf and ground cover have relatively shallow roots and require more frequent application of water to replace evapotranspiration because the soil reservoir available to their root system is relatively small. Existing practice with typical timer control systems is to provide a dual program control which enables two separate groups of valves to be timed independently for a number of days between irrigations and to water for durations which are independent of each other. The problem with that type of control is that it is quite arbitrary and independent of a situation which varies from day to day as the weather changes and it has no tangible relationship with plant water use.

Some systems use Envirotranspiration (ET). ET based systems are inaccurate and inefficient due to the simple fact that they rely on information collected above ground to theorize possible soil conditions to make watering decisions to an over-all-area. ET is only valid in the propagation one species of plan life in one given set of conditions thus on multiple species of plant life in multiple conditions, elevations and soil types, the ET equation is invalid for landscape irrigation. While many "rain check" devices will stop irrigation during and after a downpour, these devices have no way of compensating for evaporation or lack thereof over the 72 hour period immediately following rain and are easily fooled.

Prior art irrigation systems typically comprise multiple piping branches, with each branch being controlled by separate solenoid valves. Each solenoid valve is connected to a master irrigation controller and controls the flow of water from an entire piping branch. The master irrigation controller has a clock which is set to operate the solenoid valves over preselected time intervals, which are usually spaced apart by several days. Each of the piping branches extends in parallel to the other piping branches for distributing water to a defined irrigation zone, with an irrigation zone being herein defined as a region of soil which is serviced by a single piping branch. The piping branches include multiple spray heads having spray patterns which preferably overlap with the spray patterns of adjacent spray heads.

A problem with prior art irrigation systems arises since single irrigation zones will often include different types of vegetation, some of which require more frequent irrigation than other types disposed along the same piping branch. For example, a single piping branch may service an irrigation zone which includes a region of lawn grass, a region of flower beds, and both high spots, from which water will quickly run off, and low spots, where water will pool. Also, different soil types may be encountered within an irrigation zone of a consistent vegetation type. The relative amounts of water to be delivered to separate ones of the regions within a zone may differ depending upon environmental conditions, such that resizing of spray head capacities and spray patterns does not consistently alleviate this problem. Additionally, it is cost prohibitive to reroute piping branches and change spray heads when changes are made to the placement and types of vegetation found in regions services by a particular irrigation system.

Another problem with prior art irrigation system arises in irrigation systems used for preventing damage to building foundations. Where soils having high clay contents are encountered, the soil beneath building foundations are irrigated to assure consistent moisture levels over time. Prior art foundation irrigation systems are typically operated over preselected time intervals, with the irrigation system master clock controlling actuation of a solenoid valve which controls the flow of water from an entire foundation irrigation piping branch. Variations in elevation and the content of soils which extend beneath a foundation often result in varying irrigation requirements. Normally occurring changes in environmental conditions will also cause variations in moisture requirements over time. Irrigation systems which utilize a only master clock and single solenoid control valves to control piping branches, with only one control valve per piping branch to control the delivery of water to a single zone, cannot compensate for such variations.

Some prior art irrigation systems include a moisture sensor to control operation of the irrigation system in conjunction with the master clock. Prior art moisture sensors typically have two probes which extend vertically in the soil, spaced apart by a section in which moisture collects to complete a circuit between the two probes. Such prior art moisture sensors detect an averaged moisture level across a vertical distance within the soil. However, the root systems of a particular type of vegetation will usually extend downward to a particular depth within the soil. Prior art irrigation systems are not able to detect a when a preselected level of moisture content occurs at a particular depth within a soil, such that the depth of the moisture level relative to the root system of vegetation may be determined.

SUMMARY OF THE INVENTION

The invention disclosed and claimed herein comprises an irrigation system for determining the moisture content of soil in various regions of irrigation zones, such that the soil is irrigated until the moisture content of the various regions are at consistent levels. A moisture sensor is disposed in the soil within one of the various regions. The irrigation system includes an irrigation piping branch and a control valve which controls the flow of water through the irrigation branch. When the control valve is open, an irrigation fluid will pass through the valve and the irrigation branch for distribution to an irrigation region of the soil. Once the moisture within the irrigation region reaches a preselected level, the moisture sensor will close the valve, stopping the flow of the irrigation fluid from the irrigation branch to the irrigation region of the soil.

In another aspect of the present invention, the irrigation branch extends proximate to a building foundation for maintaining consistent levels of moisture within the soil beneath the foundation. A moisture sensor is placed within the soil proximate to the foundation, for detecting the level of moisture therein.

In yet another aspect of the present invention, an irrigation system includes a piping branch extends into an irrigation zone having multiple regions. One master valve controls the flow of irrigation fluid into the piping branch. Secondary valves are disposed within separate sections of the piping branch, with each section being disposed for irrigation a corresponding one of the multiple regions of the irrigation zone. Moisture sensors are disposed in various ones of the multiple regions, and connected to corresponding ones of the secondary valves for separately controlling the flow of irrigation fluids to a respective ones of the multiple regions of the irrigation zones.

BRIEF DESCRIPTION OF THE DRAWINGS

For a more complete understanding of the present invention and the advantages thereof, reference is now made to the following description taken in conjunction with the accompanying Drawings in which some like parts are number alike and in which:

FIG. 4 illustrates a schematic diagram of a control system for an irrigation system having a moisture sensor with a section type of control section included therein;

FIG. 5a illustrates a side elevational view of a moisture sensor having two sets of moisture sensing probe antennas;

FIG. 5b illustrates a schematic diagram of an electronic control circuit of a moisture sensor;

DETAILED DESCRIPTION OF THE INVENTION

Figure 1:
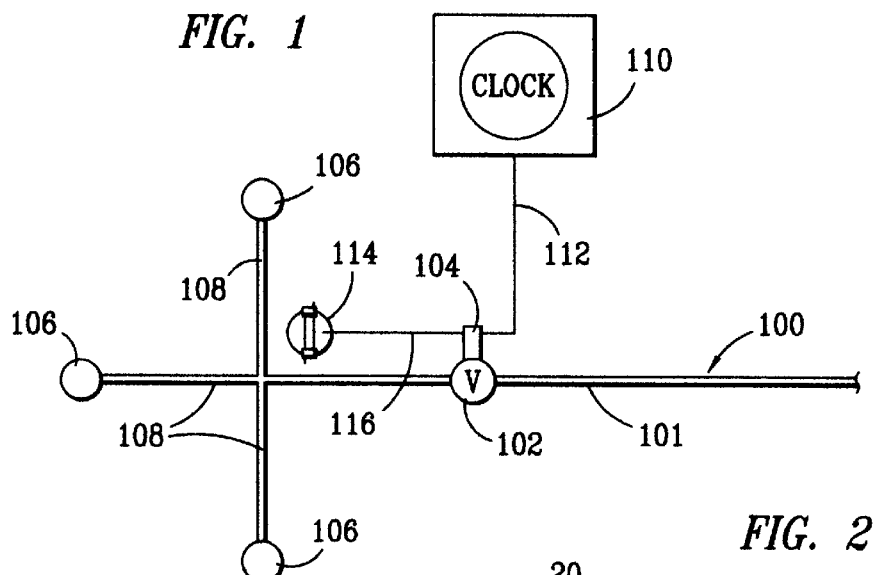
FIG. 1 illustrates a schematic view of a sprinkler system having a clock and a moisture sensor for controlling an electrically actuated valve of the sprinkler system.

Referring now to FIG. 1, there is illustrated a schematic view of a sprinkler system 100. A water supply line 101 is provided. A remotely actuated water valve 102 is provided. The water supply line 101 terminates at the water valve 102. The water valve 102 is preferably controlled by a remotely actuated device, such as a valve solenoid 104. Sprinkler heads 106 are provided. Sprinkler supply lines 108 are also provided. The sprinkler heads are connected to the valve 102 through the sprinkler supply lines 108. A clock/timer 110 is provided. The clock/timer 110 provides power through power supply line 112 to the valve solenoid 104. A moisture sensor 114 is provided. The moisture sensor 114 is disposed such that it is located in the area watered by the sprinkler heads 106. The water sensor 114 is connected to the valve solenoid 104 by sensor line 116. The moisture sensor 114 is buried in the soil so that it is totally covered by the soil.

In operation, the clock/timer 110 sends a signal along power supply line 112 to remotely actuate the valve solenoid 104 at a certain time when it is desired that the area be watered by sprinkler heads 106. The valve solenoid 104 opens the valve 102 allowing water to pass from the water supply line 101, through the sprinkler supply lines 108 and from the sprinkler heads 106. This causes the soil in the area proximate to the sprinkler heads 106 to become wet. When the area adjacent to the moisture sensor 114 has received a sufficient amount of water, the moisture sensor 114 cuts off power to the valve solenoid 104, causing the valve 102 to close. This causes the water to stop water to stop flowing from the water supply line 101, through the sprinkler supply lines 108 and from the sprinkler heads 106. If the moisture in the area decreases sufficiently while the clock/timer 110 is still sending power through the power supply line 112 to the valve solenoid 104, the moisture sensor 114 will allow the valve solenoid 104 to turn the valve 102 to the "on" position such that the sprinkler heads 106 will continue to distribute water to the area. If the area dries out after the clock timer 110 has stopped sending power to the valve solenoid 104, the valve solenoid 104 will remain closed until the clock/timer 110 once again sends power to the power supply line 112.

Figure 2:
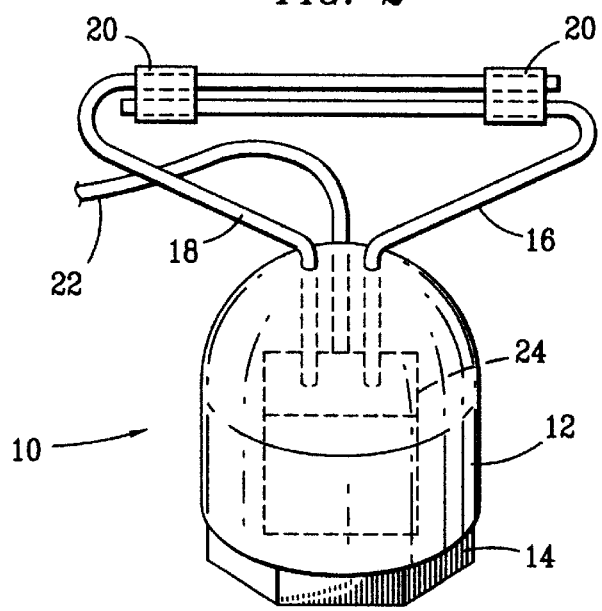
FIG. 2 illustrates a perspective view of the a first type of moisture sensor.

Referring now to FIG. 2, there is illustrated a perspective view of a moisture sensor 10. The moisture sensor 10 has of a body 12. The body 12 is made of a threaded PVC plastic cap. The body 12 is approximately two inches in diameter. An end cap 14 threadingly engages the threaded interior of the body 12, providing a water-tight seal. The sides of the end cap 14 are flat and have an octagonally shaped periphery. Extending from the top of the body 12 are two probes 16 and 18. The probes 16 and 18 extend through the top of body 12 and then are bent at an acute angle so that the ends of the probe 16 and the end of the probe 18 are parallel along the last three inches of their length. The probe 16 and the probe 18 are held in a parallel relationship by two clamps 20. The clamps 20 are made of a non-conductive material as is the body 12 and the filler 14. Probe 16 and probe 18 are made of a metallic conductive material such that electricity may pass through them. A multiconductor electrical cord 22 extends through a hole in the body 12 of the moisture sensor 10. A first pair of conductors in the cord 22 are connected to the clock or timer 110 which powers the sprinkler system. A second conductor pair of cord 22 connects to the valve solenoid 104. A relay 24 is located inside the housing 12. The relays 24 and 26 are connected to the cord 22 and also, to the probe 16 and the probe 18.

In operation, the moisture sensor 10 is buried below the ground surface such that the probe 16 and the probe 18 are at approximately the level of the shallow roots of the grass in the soil. When the soil has received enough moisture, a connection is made across the probe 16 and the probe 18, which completes an electrical circuit. This closes the water valve 102. The openings in the housing 12 where the cord 22, the probe 16 and the probe 18 enter the housing 12 are watertight.

Figure 3:
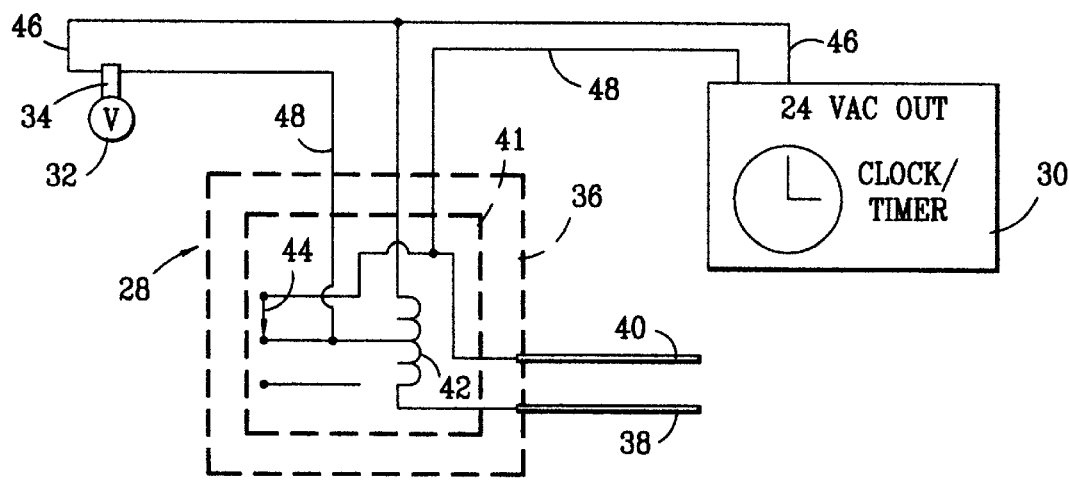
FIG. 3 illustrates a schematic diagram of a control system for an irrigation system which includes a moisture sensor.

Referring now to FIG. 3, there is illustrated a schematic overview of a control system 28, such as may be used to control the irrigation system 100. A clock/timer 30 is provided. The clock/timer 30 determines when the sprinkler system will be turned on. The clock/timer 30 has a 24 volt AC output. A valve 32 is provided which either allows or restricts water from flowing from a water supply (not shown) to a sprinkler head (not shown). A valve solenoid 34 is provided. The valve solenoid 34 is operated by 24 volt AC current and is remotely actuated to switch the valve 32 to an "on" or an "off" position. A moisture sensor 36 is provided. The moisture sensor 36 includes a probe 38 and a probe 40 which protrude from the moisture sensor 36. They are positioned such that they are parallel and slightly spaced apart from each other. The moisture sensor 36 contains a relay 41. The relay 41 contains a relay coil 42. The relay 41 contains a normally closed switch 44. The relay coil 42 is operable to open the normally closed contacts 44 when the relay coil 42 is energized. The relay 43 contains a relay coil 45 and contacts 47. Connected to the clock/timer 30 is a common wire 46 and a hot wire 48. The common wire 46 is connected from the clock/timer 30 to probe 38. The common wire 46 is also connected to the valve solenoid 34. The hot wire 48 is connected from the clock/timer 30 to probe 40. The hot wire 48 is also connected to the relay coil 42. From relay coil 42, the hot wire 48 is connected to the valve solenoid 34.

In operation, the clock/timer 30 is selectively programmed to provide watering for a certain length of time between selected intervals. When a watering cycle occurs, the clock/timer 30 sends a 24 volt AC signal through the water sensor 36 to the valve solenoid 34 which causes the valve 32 to open. The electrical signal is passed from the clock/timer 30, through the normally closed contacts 44 of the moisture sensor 36 and to the value solenoid 34. Once the soil has received a sufficient level of moisture, the moisture completes a circuit between the probe 38 and the probe 40, causing current to pass between the probe 38 and the probe 40 of a sufficient level to energize the relay coil 42. This energizes the relay coil 42, causing the normally closed contacts 44 to open disconnecting the 24 volt AC current from the valve solenoid 34 to close the valve 32, which prevents water from passing through the valve 32. Once the soil has sufficiently dried, a current of a sufficient level to energize the relay coil 42 will no longer pass between the probes 40 and 38, and the normally closed contacts 44 of the relay 41 will close. This connects the circuit from the clock/timer 30 to the valve solenoid 34, allowing the clock/timer 30 to send current to the valve solenoid 34 at a predetermined time to open the valve 32 to allow water to pass through the valve 32.

Referring now to FIG. 4, there is illustrated a schematic diagram of a control system 58 such as may be used to control the irrigation system 100 as an alternative to control system 28. The control system 58 includes a clock time 30, a moisture sensor 60, and a solenoid 74 for an electrically actuated water valve. Protruding from the main body of the water sensor 60 are probes 62 and probes 64. The probes 62 and 64 are parallel and slightly spaced apart. A common supply wire 66 and a hot supply wire 68 are also provided. The common supply wire 66 is connected to the probe 62. A valve solenoid 74 is provided. A common valve solenoid line 78 is connected to the valve solenoid 74 and to the common supply line 66. A double pole, double throw relay 70 is provided. The relay 70 is comprised of a relay coil 72, normally closed contacts 80 and normally open contacts 82. The relay coil 72 has one end connected to the hot supply line 68 and the other end thereof connected to probe 64. One of the normally closed contacts 80 is also connected to the hot supply wire 68. A hot valve solenoid line 76 is provided with one end connected to the valve solenoid 74 and the other end thereof connected to normally closed contacts 80. The open contacts 82 are not connected to anything.

In operation, the hot supply wire 68 is energized by a clock/timer 30. If the level of moisture between probes 62 and 64 are of an insufficient level to energize relay 70, a 24 volt AC current will flow from the hot supply wire 68, through the relay 70, through the normally closed contacts 80 and through the valve solenoid supply line 76 to the valve solenoid 74, thereby energizing the valve solenoid 74. When the soil receives a sufficient level of moisture, current of a sufficient level is conducted between the probe 64 to the probe 62 to energize the relay 70. When this occurs, an electrical connection is made therebetween and the common supply wire 66 is connected through the probes 62 and 64 to one terminal of relay coil 72. The other terminal of the relay coil 72 is connected to the hot supply wire 68. The relay coil 72 is energized, thereby disconnecting hot supply wire 68 from the normally closed contacts 80 and connecting it to the normally open contacts 82. This disconnects the power to the valve solenoid 74, thereby de-energizing the valve solenoid 74 and shutting off the valve 32. As long as sufficient moisture is held in the soil, the short circuit between the probes 62 and 64 will remain. Once the soil sufficiently dries, the short circuit between the probes 62 and 64 is disconnected and the relay coil 72 is not energized any longer. This allows the switch of the relay 70 to move to its normally closed position and connect the hot supply wire 68 to the normally closed switch output 80, thereby energizing the valve solenoid 74.

Referring now to FIG. 5a, there is illustrated side elevational view of a moisture sensor 120. The moisture sensor 120 consists of a body 122. The body 122 is made of a threaded PVC plastic cap. The body 122 is approximately two inches in diameter. An end cap 124 is provided. The end cap 124 is threadably engaged to the body 122. The circumferentially extending, peripheral surface of the end cap 124 is flattened, such that an octagonal structure is defined by flats such that a wrench may be used to attach the end cap 124 to the body 122. Extending from the center of the end cap 124 is a cylindrical pipe 126. The pipe 126 extends from the center of end cap 124 downwardly approximately ten inches. A pipe end cap 128 is disposed along the lower end of the pipe 126. Disposed along the lower three-quarters portion of pipe 126 are probes 131 and 132. The probes 131 and 132 are made out of an electrically conductive material whose upper and lower ends extend through the pipe 126. A wire 130 extends through an opening in the housing 122. Two upper probes 134 and 136 are disposed along the underneath edge of the end cap 124. The body 122, the end cap 124, the pipe 126, the pipe end cap 128 and the probes 131 and 132 are all attached such that the outer shell remains watertight and the only items exposed to the outside elements are the probes 131 and 132, the upper probes 134 and 136 and the wire 130. A relay 138 is connected to the wire 130 and is also connected to the probes 131, 132 and the upper probes 134 and 136. An upper probe control 137 is provided. The upper probe control 137 is connected to upper probes 134 and 136. The output of the upper probe control 137 is connected to the wires connecting the probes 131 and 132 to the relay 138.

Referring now to FIG. 5b, there is illustrated a schematic diagram of an electronic circuit of the upper probe control 137 of the moisture sensor 120. Two terminals 139 and 140 are provided. The terminals 139 and 140 are attached to the wires connecting the probes 131 and 132 with the relay 138. A triac 142 is provided. The triac 142 has a first input/output terminal, a gate terminal and a second input/output terminal. The second terminal of the triac 142 is connected to the terminal 139. The first terminal of triac 142 is connected to terminal 140. A gate control circuit 146 is provided. The gate control circuit 146 has a gate output which is connected across a resistor 144 to the gate terminal of the triac 142. The gate control circuit 146 is also connected to the terminals 139 and 140 through separate inputs. The gate control 146 has as inputs the upper probes 134 and 136. The upper probes 134 and 136 are the input to the gate control 146. The gate control 146, the gate resistor 144 and the triac 142 form the upper probe control 137.

In operation, the moisture sensor 120 is buried so that its pipe 126 is below ground and the upper probes 134 and 136 are located just above the level of the ground. When the soil has received a selected level of moisture, an electrical connection of sufficient conductivity is made within a portion of the soil extending between the probe 131 to the probe 132, causing a sufficient flow of current to effectively short the probe 131 to the probe 132 in response to the 24 volt A/C signal being emitted by the clock 30. This is turn causes the relay 138 to disconnect power to a valve solenoid (not shown) which controls a water valve (not shown). The relay 138 contains a normally closed switch that, when energized, breaks a circuit and thereby cuts off power to the valve solenoid connected thereto. If so much water has accumulated around the moisture sensor 120 that it puddles above ground level, the water will make contact with the upper probes 134 and 136 and cause a short circuit across these probes. This has the same effect as causing a short circuit across the probes 131 and 132. The relay 138 is energized and opens a normally closed switch causing power to the value solenoid to be cut off thereby closing the valve and not allowing any water to pass through the valve. Once the soil has sufficiently dried, or the puddle has soaked into the ground, the circuit from the probe 131 to the probe 132, or from the upper probe 134 to the upper probe 136, is disconnected and the normally closed switch in the relay 138 is allowed to close. This once again connects the circuit to the valve solenoid allowing the valve to be opened and allowing water to pass through the irrigation system.

Figure 6:
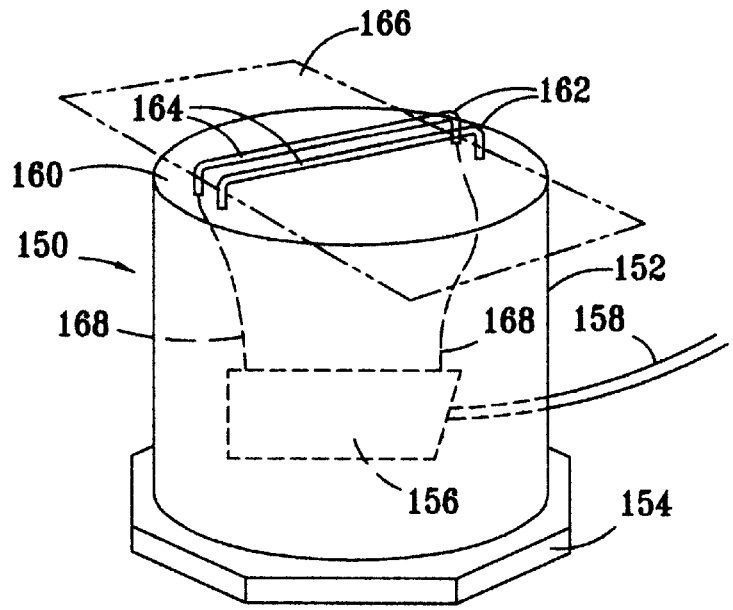
FIG. 6 illustrates a perspective view of a lateral-plane moisture sensor made according to a preferred embodiment of the present invention.

Referring now to FIG. 6, there is illustrated a perspective view of a lateral-plane moisture sensor probe assembly 150 made according to a preferred embodiment of the present invention. The moisture sensor 150 has a cylindrical exterior housing 152, which is preferably formed of a PVC end cap. The housing 152 has an interiorly threaded lower opening in into which a threaded plug 154 secures with a fluid-tight seal therebetween. An electric control section 156 is disposed interiorly within the housing 152. Conductors 158 extend from control section 156, through a fluid-tight sealed port in the side of housing 152, and back to the clock timer 30 (shown in FIG. 3). The housing 152 has a slightly rounded, substantially flat uppermost end 160 from which two antennas 162 extend.

The two antennas 162 are formed from two round, solid metal rods 161 which are spaced apart in a substantially parallel alignment. The two rods 161 extend from the uppermost ends of the cap 152 straight upward with short riser sections 163 of length which is significantly shorter and the length of a main, central body portions 164 of the antennas 162, then extend with the main body portions 164, then extend downwards with riser sections 163, back into the uppermost end of the cap 152. The central main body portions 164 extend laterally aside of one another, preferably in parallel, within a singular, laterally extending, horizontal plane 166. Each of the rods 161 are preferably bent with two right angles, such that the central main body portions are at right angles to the short riser sections 163, with a curved, radiused section disposed for providing a smooth transition therebetween. The main body portions 164 are the longer portions of the two antennas 162, and extend in a substantially parallel alignment within a singular horizontal plane. The length of the upwards short riser sections 163 are chosen such that, in relation to the overall lengths of conductive metal rods 161 and the length of the main body portions 164 of the antennas 162, the effective region of investigation of the moisture sensor 152 extends is substantially contained within the horizontal plane 166 within which the laterally disposed, spaced apart main body portions 164 of the antennas 162 extend. Each of the rods 161 of the antennas 162 extend from within the housing 152 at two places, through the uppermost end 160 of the housing 152, preferably with a potting material sealing between the rods 161 and the uppermost end 160 of the cap 152. Two pairs of conductors 168 each connect on one end to respective ends of the laterally spaced antennas 162, and on the other ends thereof to the control section 156.

It is desirable to preselect, according to soil types, soil conditions, vegetation and other ground cover, terrain and the intended use for the region of the soil, the depth beneath ground surface of the soil at which the horizontal plane 166 within which the main body sections 164 of antenna probes 160 laterally extend to define the depth of investigation of the moisture sensor 150, that is, to define the depth at which the horizontal plane laterally extends beneath the ground surface of the soil. As a general rule, for heavy clays, the main body portions 164 of the sensor antennas are disposed approximately two 2.0 inches deep, beneath the surface of the ground. For sandy clays, the depth of the main body portions 164 of the antenna 160 will range approximately from three 3.0 to four 4.0 inches deep. For most generally types of conditions, the lateral plane antennas 160 may be substantially disposed at a depth of approximately four 4.0 inches beneath the ground surface of the soil. The moisture sensor 150 will thus detect a predetermined level of moisture, that is an amount of moisture, within the soil at a predetermined level, or depth, beneath the surface of the soil.

Figure 7:
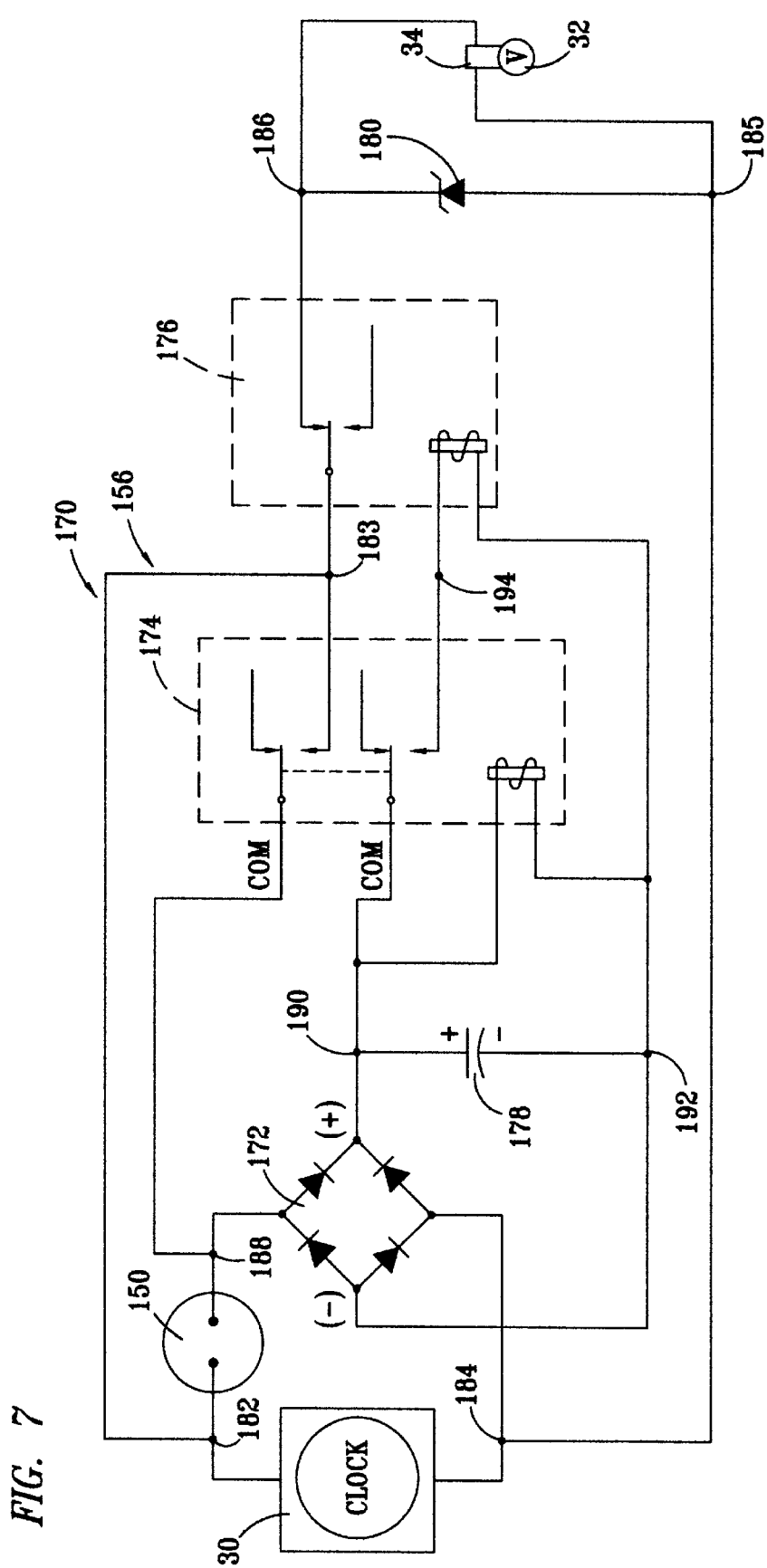
FIG. 7 illustrates a schematic diagram of an electric control circuit of the moisture sensing system made according to the preferred embodiment of the present invention.

Referring now to FIG. 7, there is illustrated a schematic diagram of an electrical circuit for an irrigation control system 170 which comprises the clock 30, the water valve 32, the moisture sensor 150 and the control section 156. The control section 156 includes a bridge rectifier 172, which is a full wave rectifier, a double pole-double throw relay 174, a single pole-single throw relay 176, a capacitor 178, and a surge suppressor 180. The surge suppressor 180 is preferably provided by a zener diode. As discussed above, the clock 30 preferably provides a 24 volt AC control/power signal during selectably settable time intervals, which define watering cycles. The clock 30 is connected between the terminals 182 and 184.

One antenna of the moisture sensor 150 is connected to the terminal 182, which is connected to a node 183. The node 183 is connected both to the common terminal of the relay 176 and to the normally opened, switched leg of the first set of the contacts of the relay 174. The normally closed switched leg of the relay 176 is connected to the terminal 186. The terminal 184 is connected to the terminal 185, and to one end of the surge suppressor 180. The valve solenoid 34 is connected on one end to the terminal 86, and on the other end thereof to the terminal 186.

The second antenna of the moisture sensor 150 is connected to the terminal 188. The terminal 188 is connected both to the common terminal of the first set of contacts of the relay 174, and to the AC input of the rectifier 172. The terminal 184, to which the clock 30 is connected, is connected to the other AC input of the rectifier 172. The positive output of the rectifier 172 is connected to a node 190. The node 190 is connected to the solenoid of the relay 174 and the common terminal of the second set of contacts of the relay 174. The positive pole of the capacitor 178 is also connected to the node 190. The negative pole of the capacitor 178 is connected to the node 192. The negative voltage output of the rectifier 172 is connected to a node 192. The node 192 is connected to the negative terminal of the capacitor 178, to the solenoid for the relay 174, and to the solenoid for the relay 176. The normally open terminal of the second set of contacts for the relay 174 is connected to a node 194, which is connected to the second end of the solenoid for the relay 176.

In operation, when a watering cycle occurs the clock 30 will apply 24 volts AC across the terminals 182 and 184. Prior to a sufficient level of moisture being disposed between the main body portions 164 of the antennas 162 of the moisture sensor 150 such that an electric current will be conducted therebetween in response to the 24 volt AC signal from the clock 30, an open circuit will exist between the antennas 162. Current will pass from the node 182 through the common terminal of the relay 176, and through the normally closed contact of the relay 176 to the terminal 186. Current will also pass from the clock 30, through the terminal 184 and to the terminal 185. The 24 volt AC current from the clock 30 will thus be applied to both terminals of the solenoid 34 of the valve 32.

Once a sufficient amount of moisture is disposed between the laterally spaced apart antennas 162 in the horizontal plane 166, an electric current will pass from the terminal 182, through the wet earth between the antennas 162, and to the node 188. A voltage will thus be applied to both of the AC inputs of the rectifier 172. As a result thereof, the AC signal from the clock 30 will be rectified and applied across the capacitor 178, causing a positive DC voltage to be applied across the nodes 190 and 192. Application of a positive DC voltage being applied from the node 192 to the node 190 will cause the solenoid of the relay 174 to energize, switching the common, switched leg of the second set of contacts of the relay 174 from the normally closed contact to the normally opened contact, applying the DC voltage from the rectifier 172 to a node 194. This applies the DC voltage to the solenoid of the relay 174, energizing the relay 174 to move the common switched legs thereof from respective ones of the normally closed to respective ones of the normally opened contact, connecting the node 188 to the node 183 and connecting the node 190 to the node 194.

Energizing the relay 174 disconnects the AC voltage applied by the clock 30 from being applied across the nodes 185 and 186, and being applied across the solenoid 34 of the valve 32. Additionally, the common terminal of the first set of contacts of relay 174 will move from being in contact with the normally closed contact to being in contact with the normally opened contact thereof, connecting the node 183 to the terminal 188. This bypasses the antennae 162, such that current will pass from the clock 30, through the terminal 182, to the node 183 and through the first set of contacts of the relay 174 to the terminal 188. This causes the AC input to be continued to be applied to the rectifier 172, which latches the relay 174 and the actuated position, which then latches relay 176 in the actuated position. This causes the terminal 186 to be disconnected from the node 183 and the terminal 182 since the relay 176 remains actuated until the clock cycle ends, and the 24 volts AC is no longer applied across the terminals 182 and 184. Thus, the irrigation control system 170 will latch itself into the later position once sufficient moisture had been accumulated between the antennas 162. Interconnecting the relays 174 and 176 within the control system 170 such that the moisture sensor 150 will latch into a mode or state for disabling the application of power to the electrically operated valve 32 to prevent the flow of water therethrough, will prevent the valve 32 from cycling between opened and closed positions during a single watering cycle.

Figure 8:
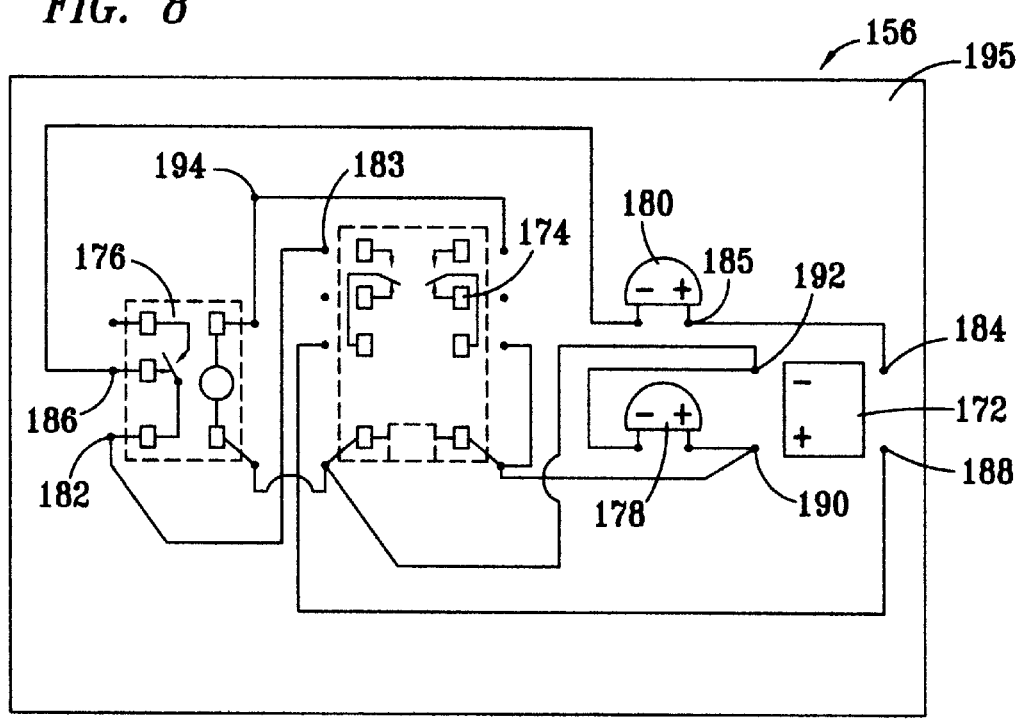
FIG. 8 illustrates a schematic diagram of an electric control circuit of the moisture sensing system made according to an alternative embodiment of the present invention.

Referring now to FIG. 8, there is illustrated a bottom view of a printed wiring assembly which provides the control section 156. The printed wiring assembly includes a circuit board 195 to which the relays 174 and 176, the bridge rectifier 172, the capacitor 178 and the surge suppressor 180 are mounted. The clock 30 is connected on one end to the terminal 182, and on the other end to the terminal 184. The antennas 162 of the moisture sensor 150 are connected such that a first one of antennas 162 is attached to the terminal 182, and a second antennae is attached to the terminal 188. One end of the solenoid 34 of the valve 32 is connected to the terminal 184, and the other end of the solenoid 34 is connected to the terminal 182.

Figure 9:
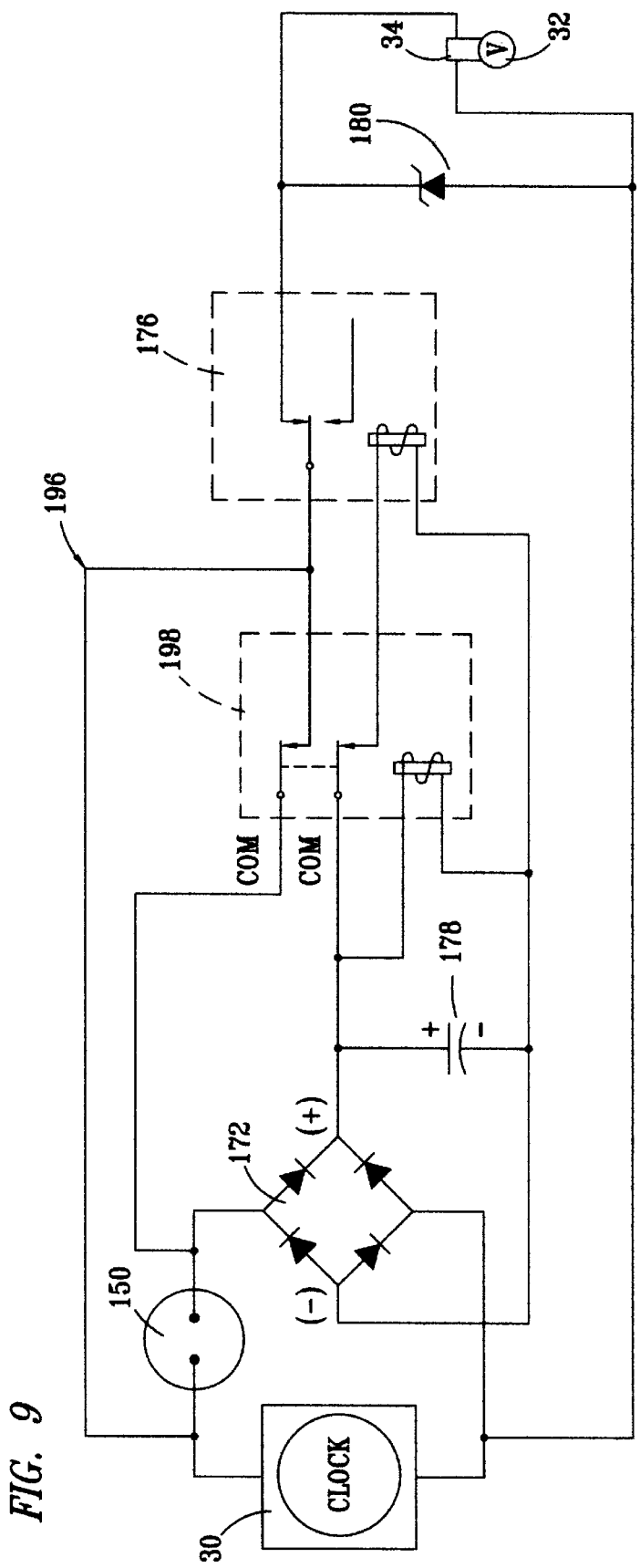
FIG. 9 illustrates a plan view of a circuit board and components for a control section made according to the present invention.

Referring now to FIG. 9, there is illustrated a schematic diagram of an alternative embodiment of the control section 156 of an alternative irrigation control system 196. The alternative irrigation control system 196 is virtually identical to the control section 156 depicted in FIG. 7, except that the double pole, double throw relay 174 of the control section 156 has been replaced by a single throw, double throw relay 198. The operation of the alternative irrigation control system 196 is virtually identical with that discussed above for the control section 156.

Figure 10:
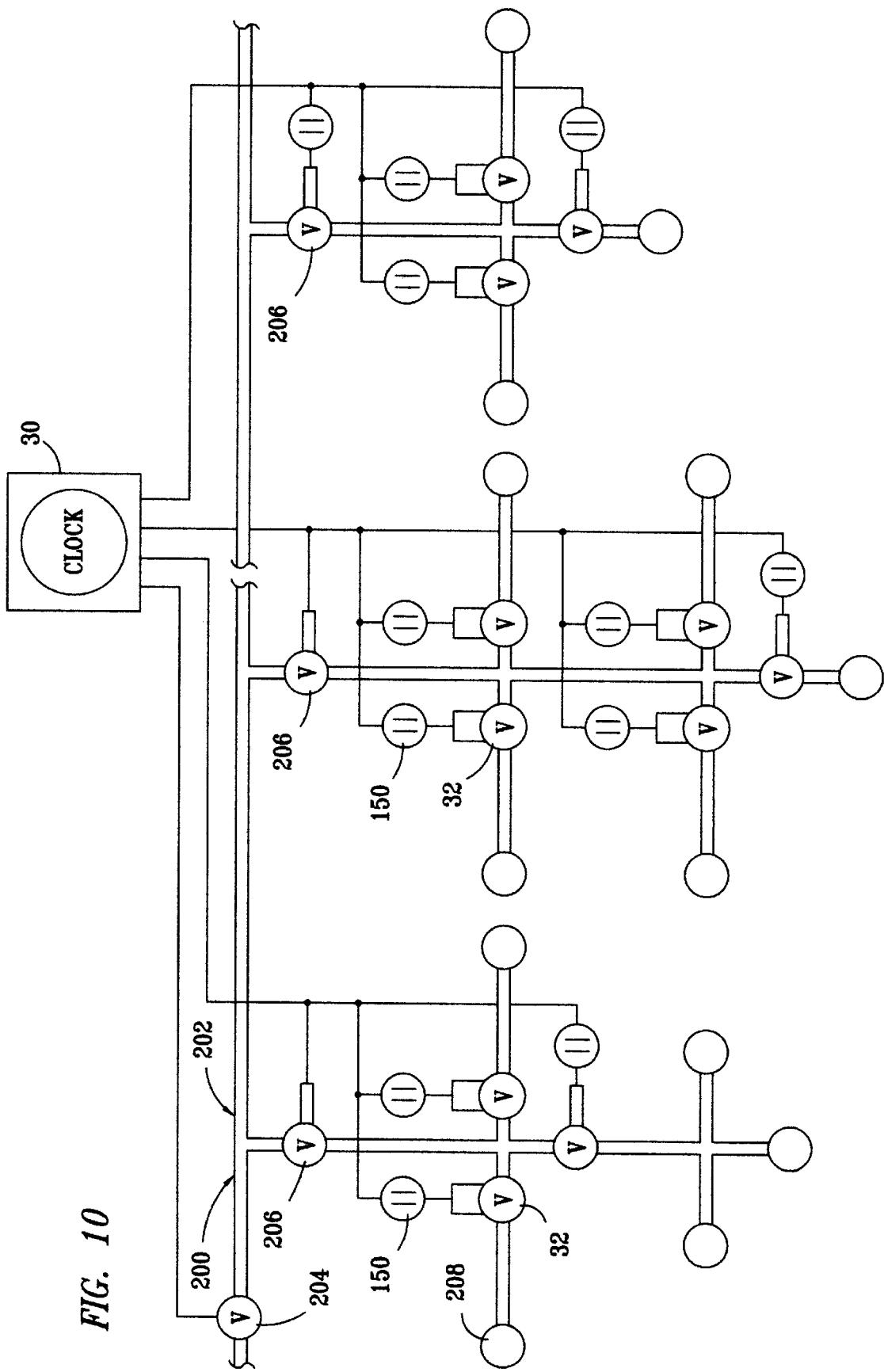
FIG. 10 illustrates a plan view of an irrigation system having a smart-sensor section made according to the present invention.

Referring now to FIG. 10, there is illustrated a schematic diagram of a top plan view of an irrigation system 200. The irrigation system 200 includes a clock 30 and a piping distribution system 202. A master valve 204 is connected to the clock 30 in a typical configuration. Master valve 204 must be actuated in order for water to flow through to the piping distribution system 202. The piping system 202 includes a plurality of piping branches, each of which are controlled by a primary valve 206. In a typical prior art irrigation system, the primary valves 206 would be selectively actuated by the clock 30 according to a preselected time intervals. However, according to the present invention, moisture sensors 150 and secondary valves 32 have been added to the irrigation system 200. Thus, each of the secondary piping branches provides a smart-section which can detect when adequate moisture levels are disposed in regions of the soil which are proximate to each of the moisture sensors 150. Preferably, at least two regions are defined within each sprinkler irrigation zone, with an irrigation zone being the smallest portion of the irrigation system which is individually controlled by the clock 30.

The valve 32 will be selectively actuated by the moisture sensors 150 in conjunction with the clock 30, such that once a sufficient level of moisture is detected by the moisture sensor 150, a valve 32 will close and prevent water from being sprayed from the spray heads 206. In other embodiments, singular or multiple spray heads may be configured at each such smart-section. Additionally, the primary valves may also be equipped with one of the moisture sensors 150 for operation to prevent water flow to an entire branch of the piping system 200. This type of water distribution system 200 is especially useful where variant types of soil conditions are topographies are encountered, such as in irrigation zones which include both high and low spots. Additionally, this may also be advantageous in agricultural applications, such as for irrigating orchards.

Figure 11:
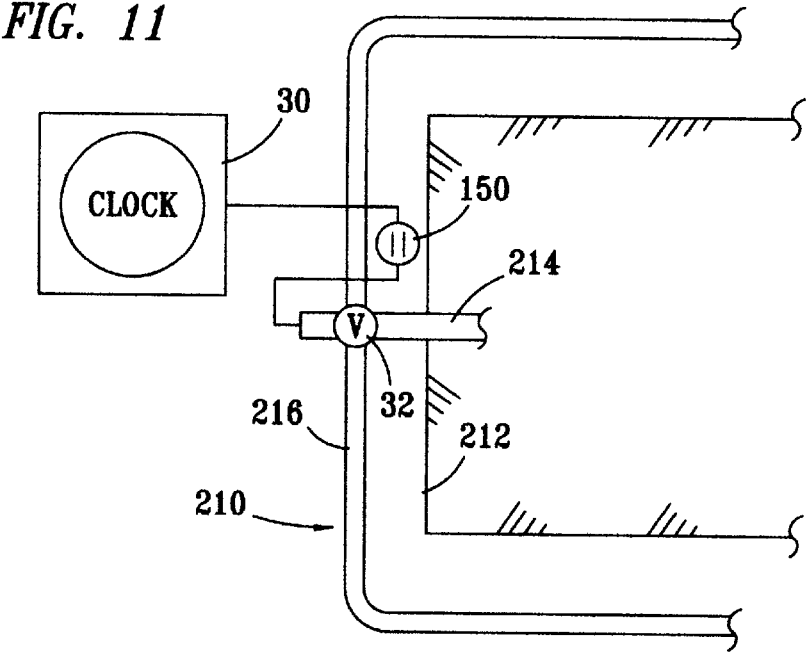
FIG. 11 illustrates a plan view of a foundation irrigation system having a single irrigation zone.

Referring now to FIG. 11, there is illustrated a top plan view of an irrigation system 210 for irrigating the soil which is disposed about a foundation 212 of a building. The irrigation system 210 operates to prevent structural damage to the foundation 212 by preventing varying levels of moisture within the soil beneath the foundation 212 which could cause he earth, or soil, beneath the foundation to expand and contract. The irrigation system 210 includes a clock 30 which is connected to the moisture sensor 150 and to a control valve 32. The valve 32 is connected to a water source 214. The piping distribution system 216 extends from the valve 32, with the valve 32 controlling the flow of water from the water source 214 to the piping distribution system 216. Preferably, the piping distribution system 216 is provided by a standard type of soaker hose. The soaker hose is preferably laid upon the top of the ground. In alternative embodiments, a one-half inch PVC pipe could be utilized which is buried approximately two inches beneath the surface of the soil. The PVC piping would preferably have one-eighth inch holes which are spaced two inches apart to provide a drip type of water delivery system. This PVC pipe could also be disposed above the ground surface, or extend beneath foundation 212. In the preferred embodiment, the piping systems 216 is disposed approximately six 6.0 to twelve 12.0 inches from the side of the foundation 212. The moisture sensor 150 will preferably be disposed approximately six 6.0 to twelve 12.0 inches beneath the ground system, or preferably to the depth of the foundation 212.

Figure 12:
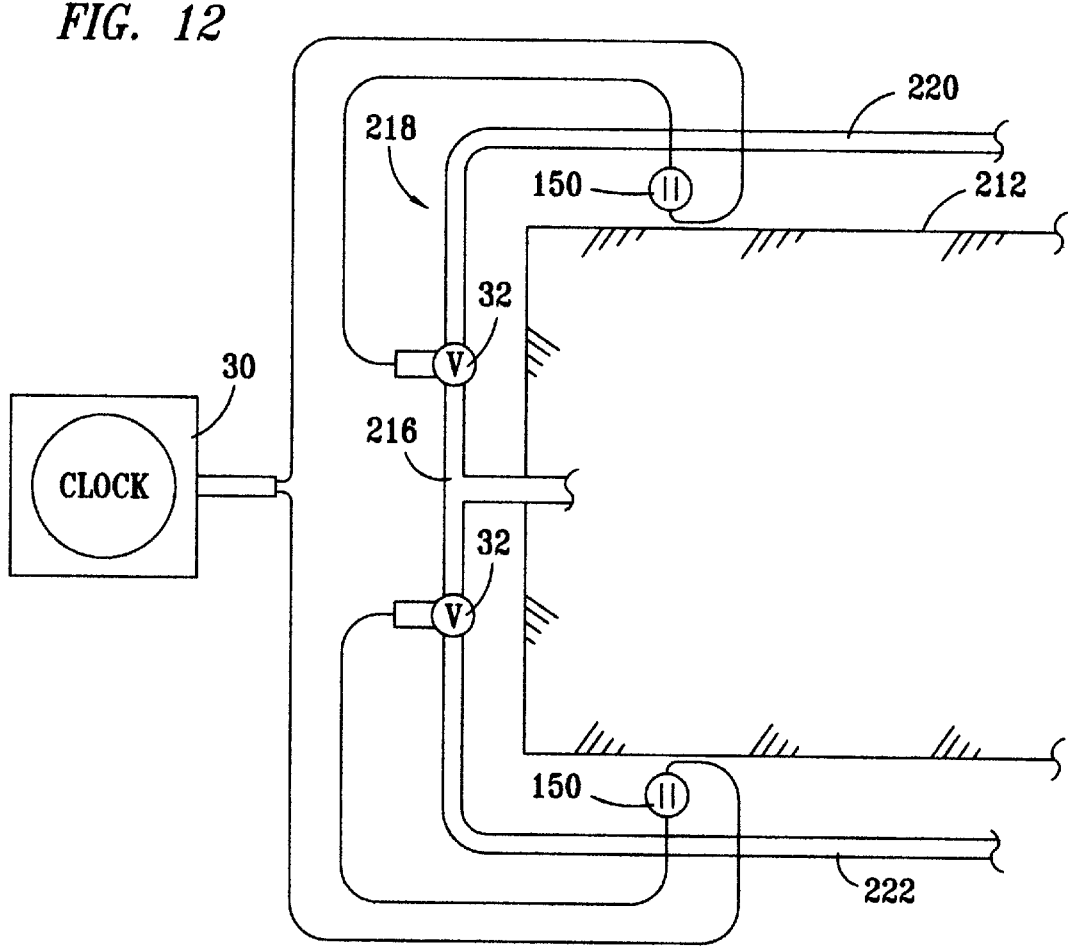
FIG. 12 illustrates a plan view of a foundation irrigation system having two piping sections.

Referring now to FIG. 12, there is illustrated a schematic, top plan view of an irrigation system 218 of the present invention. Irrigation system 218 is preferably utilized for maintaining a consistent level of moisture beneath the foundation 212 to prevent damage by the swelling and contraction of the soils there below in response to varying moisture contents therein. The clock 30 is selectively set to apply 24 volts AC during selectable watering cycles. The piping system 216 comprises two branches, a branch 220 and a branch 222. Each of the branches 220 and 222 are controlled by a separate solenoid valve 32, which from the other end is connected to a water source 214. A separate moisture sensor 150 is provided for each of the valves 32 such that the valves 32 will be closed to prevent flow through each of the respective branches 220 and 222 when a sufficient amount of moisture is disposed beneath the foundation 212 for satisfying the moisture sensors 150.

Figure 13:
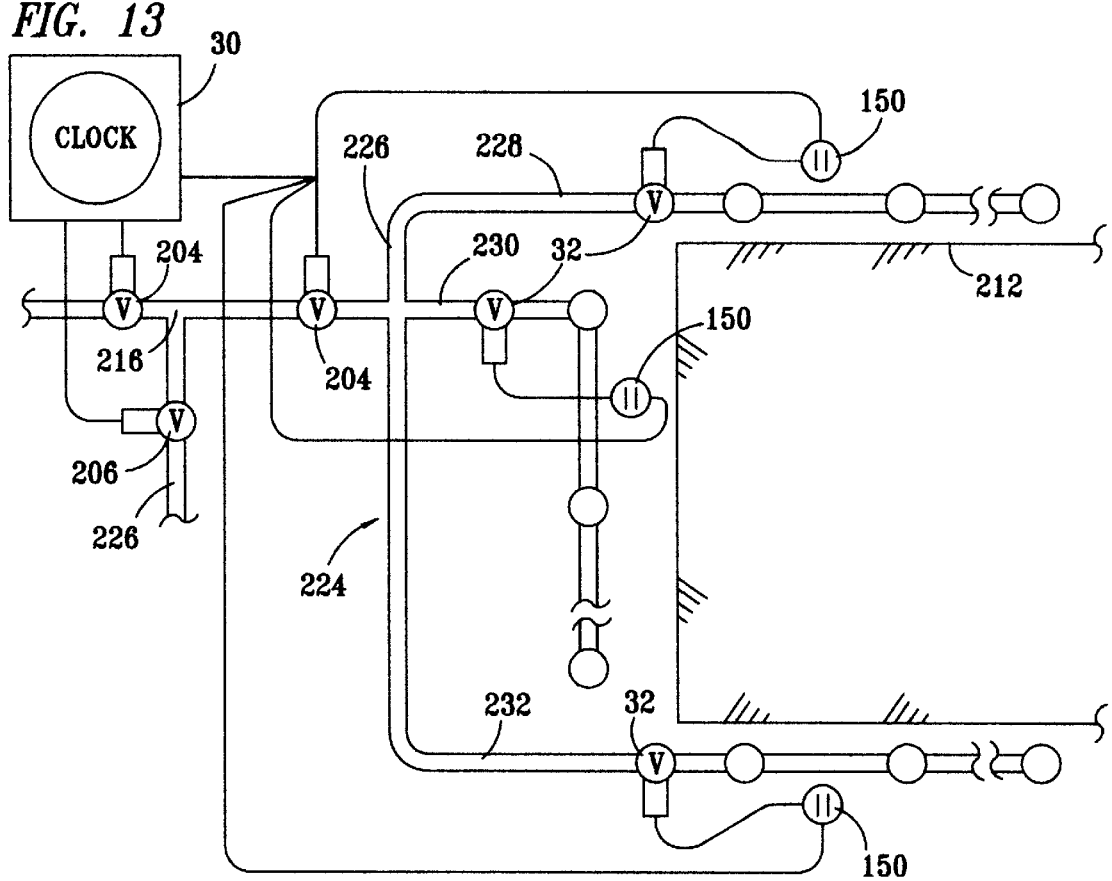
FIG. 13 illustrates a plane view of a foundation irrigation system having an irrigation zone piping system which is divided into smart sections.

Referring now to FIG. 13, there is illustrated a schematic, plan view of an irrigation system 224 for maintaining consistent levels of moisture beneath a foundation 212. The irrigation system 224 utilizes a plurality of smart-sections similar to those described above in reference to FIG. 10. The piping system 216 is connected to a water source 214. The water source 214 may be external from the building disposed on the foundation 212, or may come interiorly therefrom. The clock 30 is connected to a master valve 204 so that water will be supplied to the piping system 214 when the clock 30 initiates a watering cycle. The irrigation system 224 includes a plurality of piping branches 226 (one shown), with separate primary solenoid valves 206 which are selectively controlled by the clock 30. When water pressure is supplied to the master valve 204 and one of the primary valves 206 to the branch 226, water will flow through each of the three (3) piping sections 228, 230 and 232 and through spray heads 106. It should be noted that another embodiments of the present invention, a perforated-type of PVC piping system or a circular hose may be utilized. Once a sufficient level of moisture has been applied to the regions of the soil which are proximate to the moisture sensors 150, particular ones of the valves 32 connected to corresponding moisture sensor 150 which will be automatically closed to prevent water from passing through the respective piping sections 228, 230 and 232. Thus, over watering of the soil beneath the foundation 212 will be prevented.

Figure 14:
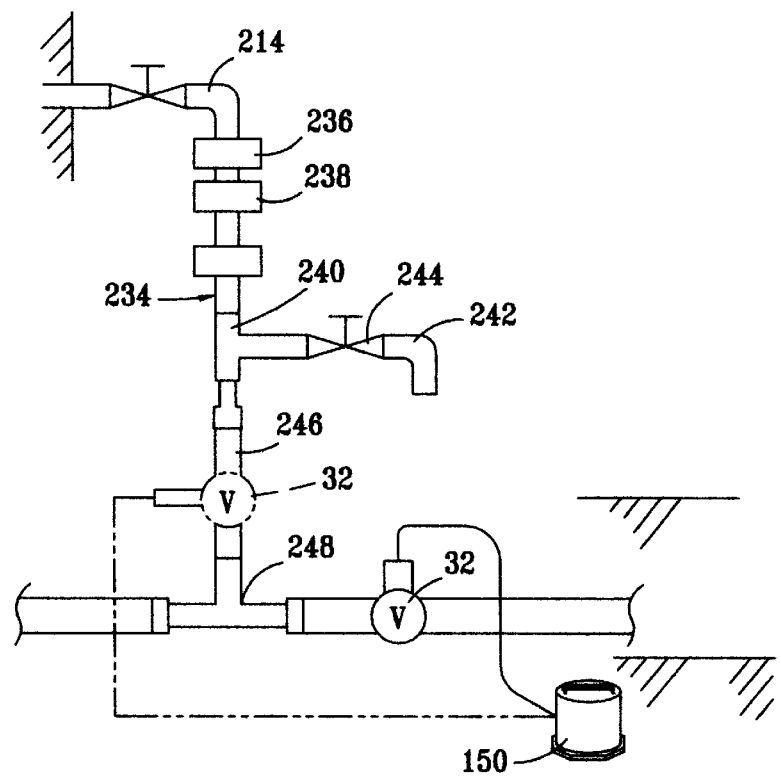
FIG. 14 illustrates a side elevational view of a piping connection assembly of an irrigation system.

Referring now to FIG. 14, there is illustrated an irrigation system piping connection assembly for 234 for connecting to a water source 214, such as a standard outdoor faucet of the type commonly found in residential housing. The connection assembly 234 includes a standard female water faucet connection 236 for connecting to faucet 214. A quick connect 238 is mounted there below. A piping tee 240 provides a bypass for attaching a second water faucet 242 with a valve 244 for connecting a garden hose thereto.

Beneath the piping tee 240 is a standard section of garden hose 246, which is preferably approximately two (2) feet long. An optional valve 32 is depicted as being disposed beneath the garden hose 246 and above the piping tee 248. Then, the piping section 216 extends with a valve 32 and a moisture sensor 150 according to the present invention. The piping connection 234 may be utilized in different configurations of the present inventions, such as those discussed above in reference to FIGS. 11–13.

The present invention thus provides several advantages over prior art irrigation systems. Smart-sections of piping branches may be utilized to prevent are which is being irrigated from becoming more saturated with water than another area which are also being irrigated, providing more consistent and uniform moisture levels throughout the area being irrigated than is attained without smart-section piping branches. Additionally, an irrigation system of the present invention assures that soil beneath a building foundation will consistently be irrigated to uniform levels of moisture, preventing damage to the building foundation from ground swelling and contraction which occurs in response to varying levels of moisture content.

Although the preferred embodiment has been described in detail, it should be understood that various changes, substitutions and alterations can be made therein without departing from the spirit and scope of the invention as defined by the appended claims.

What is claimed is:

1. A method for distributing water to soil, comprising the steps of:

providing a pipe system having at least one branch, with an electrically actuated valve disposed therein for controlling the flow of water through at least part of the branch;

providing a primary system controller for selectively applying electric power to actuate the electrically actuated valve;

providing a moisture sensor having an exterior housing and two laterally spaced apart antennas which extend from the exterior housing, each of the antennas including a short section and a main body section, wherein the short sections extend from the exterior housing and bend to define the main body sections, the main body sections are spaced apart to extend substantially within a laterally extending, singular horizontal plane, and the short sections extend in relation to the main body sections such that an effective region of investigation of the moisture sensor is defined within the singular horizontal plane;

electrically connecting the electrically actuated valve to the primary system controller, with the moisture sensor connected directly therebetween for switching an electrical power leg extending between the primary system controller and the electrically actuated valve;

burying the moisture sensor within the soil, such that the main body sections and the effective region of investigation defined by the main body sections of the antennas of the moisture sensor are disposed substantially within the laterally extending, single horizontal plane at a preselected depth, and the short sections of the antennas extend downward therefrom, such that the external housing of the moisture sensor is disposed beneath the main body sections of the antennas;

actuating the primary system controller, such that power is applied to the electrical power leg, the moisture sensor and the electrically actuated valve to selectively actuate the electrically actuated valve and pass water through the pipe system to a portion of the soil;

detecting with the main body sections of the antennas of the moisture sensor when the water level within the portion of the soil is disposed at a preselected depth, corresponding to the laterally extending, single horizontal plane disposed at the preselected depth; and automatically closing the electrically actuated valve in response to detecting the water level being disposed at the preselected depth within the soil.

2. The method according to claim 1, further comprising the steps of:

separately restricting the flow of water through different sections of said branch in response detecting that the water levels within different portions of the soil are disposed at preselected depths.

3. A water distribution system for irrigating soil, comprising:

a pipe system having at least one branch for distributing water to the soil;

an electrically actuated valve for controlling a flow of the water through said branch;

a primary system controller for selectively applying electric power to actuate said valve;

a moisture sensor having an exterior housing and two laterally spaced apart antennas which extend from said exterior housing, each of said antennas including a short section and a main body section, wherein said short sections extend from said exterior housing and bend to define said main body sections, said main body sections are spaced apart to extend substantially within a laterally extending, singular horizontal plane, and said short sections extend in relation to said main body sections such that an effective region of investigation of said moisture sensor is defined substantially within the singular horizontal plane;

wherein said moisture sensor is disposed within the soil for determining a level of moisture within a portion of the soil which is proximate to said moisture sensor and disposed within the laterally extending, singular horizontal plane; and wherein said moisture sensor is electrically connected to at least one of said primary system controller and said valve for selectively closing said valve to prevent the flow of water through said branch in response to said moisture sensor detecting the level of moisture within the portion of the soil proximate to said moisture sensor.

4. The water distribution system according to claim 3, wherein said main body sections of said antennas extend in parallel within the laterally extending, singular horizontal plane.

5. The water distribution system according to claim 4, wherein said pipe system extends proximate to a building foundation, and said moisture sensor is disposed for determining whether a sufficient level of moisture is present within the soil proximate to the building foundation.

6. The water distribution system according to claim 3, further comprising:

said branch including a plurality of piping sections for distributing water to different regions of the soil, the flow of water through a first one of said piping sections being controlled by said electrically actuated valve;

a second electrically actuated valve included within said branch for separately controlling the flow of water through a second piping section of said branch;

said primary system controller being connected to said valves for selectively applying electric power to simultaneously actuate said valves of said branch;

a second moisture sensor disposed within one of the regions being irrigated by the second piping section for determining a respective level of moisture within a second portion of the soil which is proximate to said second moisture sensor; and said second moisture sensor being electrically connected to at least one of said primary system controller and said second valve for selectively closing said second said valve to prevent the flow of water through said second piping section in response to detecting the respective level of moisture within the second portion of the soil proximate thereto.

7. The water distribution system according to claim 1, wherein said exterior housing comprises an exterior surface which extends adjacent to and substantially parallel to said main body sections of said antennas.

8. The water distribution system according to claim 7, wherein said main body sections of said antennas contact said exterior surface of said exterior housing.

9. The water distribution system according to claim 1, wherein said short sections of said antennas define first short sections, each of said antennas further include second short sections, which extend from opposite ends of respective ones of said main body sections than said first short sections, and said second short sections extend from said ends of said main body sections into said exterior housing, such that said main body portions are each secured to said exterior housing on said opposites ends by respective ones of said first and second short sections.

10. The water distribution system according to claim 1, wherein said moisture sensor includes a control section which is disposed within said exterior housing of said moisture sensor, and electrically connected directly between said electrically actuated valve and said primary system controller for directly controlling said electrically actuated valve according to the level of moisture detected within the portion of the soil disposed proximate to said moisture sensor.

11. The water distribution system according to claim 10, wherein said control section includes two devices which each have a common leg and a switched leg, wherein said two devices are actuated to electrically connect respective ones of said common legs to said switched legs, and said two devices are electrically connected together and to said two laterally spaced apart antennas and said primary system controller, such that said two devices are actuated and then latched into actuated positions upon a predetermined level of moisture being detected in the portion of the soil disposed proximate to said laterally spaced apart antennas until power is removed therefrom by said primary system controller.

12. A water distribution system for irrigating soil, comprising:

a pipe system having at least one branch for distributing water to the soil;

an electrically actuated valve for controlling a flow of the water through said branch;

a primary system controller for selectively applying electric power to actuate said valve;

a moisture sensor having an exterior housing and two laterally spaced apart antennas which extend from said exterior housing, each of said antennas including a short section and a main body section, wherein said short sections extend from said exterior housing and bend to define said main body sections, said main body sections are spaced apart to extend substantially within a laterally extending, singular plane, and said short sections extend in relation to said main body sections such that an effective region of investigation of said moisture sensor is defined substantially within the singular plane;

said moisture sensor further having a control section which is disposed within said exterior housing, and electrically connected directly between said electrically actuated valve and said primary system controller for directly controlling said electrically actuated valve according to the level of moisture detected within the portion of the soil disposed proximate to said moisture sensor;

wherein said moisture sensor is disposed within the soil for determining a level of moisture within a portion of the soil which is proximate to said moisture sensor and disposed within the laterally extending, singular plane; and wherein said moisture sensor is electrically connected to at least one of said primary system controller and said valve for selectively closing said valve to prevent the flow of water through said branch in response to said moisture sensor detecting the level of moisture within the portion of the soil proximate to said moisture sensor.

13. The water distribution system according to claim 12, wherein said main body sections of said antennas extend in parallel within the laterally extending, singular plane.

14. The water distribution system according to claim 12 wherein said pipe system extends proximate to a building foundation, and said moisture sensor is disposed for determining whether a sufficient level of moisture is present within the soil proximate to the building foundation.

15. The water distribution system according to claim 12, further comprising:

said branch including a plurality of piping sections for distributing water to different regions of the soil, the flow of water through a first one of said piping sections being controlled by said electrically actuated valve;

a second electrically actuated valve included within said branch for separately controlling the flow of water through a second piping section of said branch;

said primary system controller being connected to said valves for selectively applying electric power to simultaneously actuate said valves of said branch;

a second moisture sensor disposed within one of the regions being irrigated by the second piping section for determining a respective level of moisture within a second portion of the soil which is proximate to said second moisture sensor; and said second moisture sensor being electrically connected to at least one of said primary system controller and said second valve for selectively closing said second said valve to prevent the flow of water through said second piping section in response to detecting the respective level of moisture within the second portion of the soil proximate thereto.

16. The water distribution system according to claim 12, wherein said exterior housing comprises an exterior surface which extends adjacent to and substantially parallel to said main body sections of said antennas.

17. The water distribution system according to claim 16, wherein said main body sections of said antennas contact said exterior surface of said exterior housing.

18. The water distribution system according to claim 17, wherein said short sections of said antennas define first short sections, each of said antennas further include second short sections, which extend from opposite ends of respective ones of said main body sections than said first short sections, and said second short sections extend from said ends of said main body sections into said exterior housing, such that said main body portions are each secured to said exterior housing on said opposites ends by respective ones of said first and second short sections.

19. The water distribution system according to claim 12, wherein said control section includes two devices which each have a common leg and a switched leg, wherein said two devices are actuated to electrically connect respective ones of said common legs to said switched legs, and said two devices are electrically connected together and to said two laterally spaced apart antennas and said primary system controller, such that said two devices are actuated and then latched into actuated positions upon a predetermined level of moisture being detected in the portion of the soil disposed proximate to said laterally spaced apart antennas until power is removed therefrom by said primary system controller.

* * * * *

UNITED STATES PATENT AND TRADEMARK OFFICE
CERTIFICATE OF CORRECTION

PATENT NO. : 5,908,045
DATED : June 1, 1999
INVENTOR(S) : Wallace et al

It is certified that error appears in the above-identified patent and that said Letters Patent is hereby corrected as shown below:

Column 1,
Line 24, replace "thereof" with -- thereof. --

Column 5,
Line 2, replace "This causes the water to stop water to stop" with -- This causes the water to stop --

Signed and Sealed this

Seventeenth Day of September, 2002

Attest:

Attesting Officer

JAMES E. ROGAN
Director of the United States Patent and Trademark Office